Figure 1:
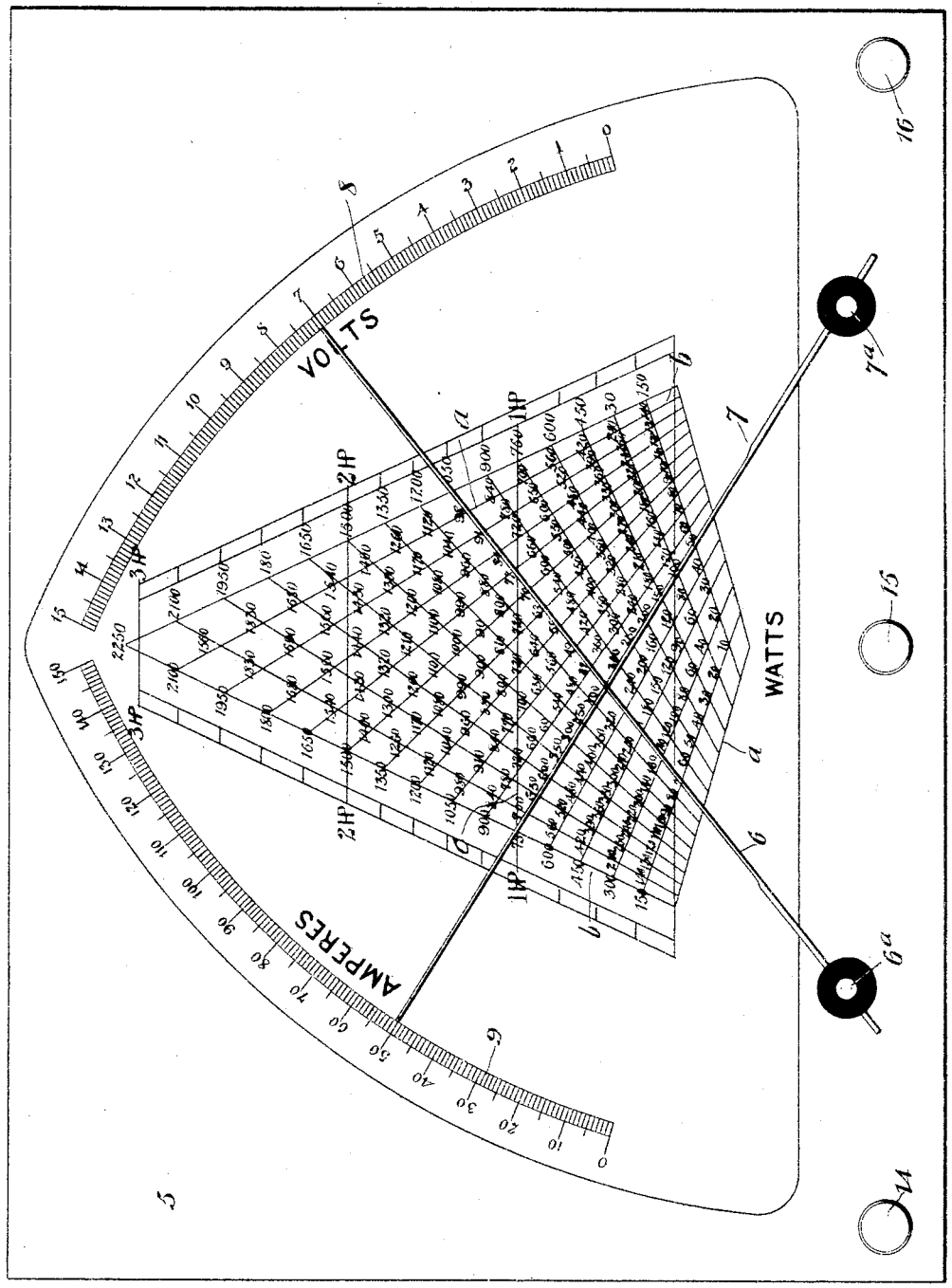

No. 791,785. PATENTED JUNE 6, 1905.
H. HERTZBERG & W. P. SNYDER.
DIRECT READING HORSE POWER AND WATT METER.
APPLICATION FILED FEB. 2, 1904.

2 SHEETS—SHEET 1.

Witnesses
Edw. Thorpe
V. E. Nichols

H. Hertzberg and
W. P. Snyder
Inventors.

By their Attorneys
Griffin, Benedict & Cavanagh

No. 791,785. PATENTED JUNE 6, 1905.
H. HERTZBERG & W. P. SNYDER.
DIRECT READING HORSE POWER AND WATT METER.
APPLICATION FILED FEB. 2, 1904.
2 SHEETS—SHEET 2.
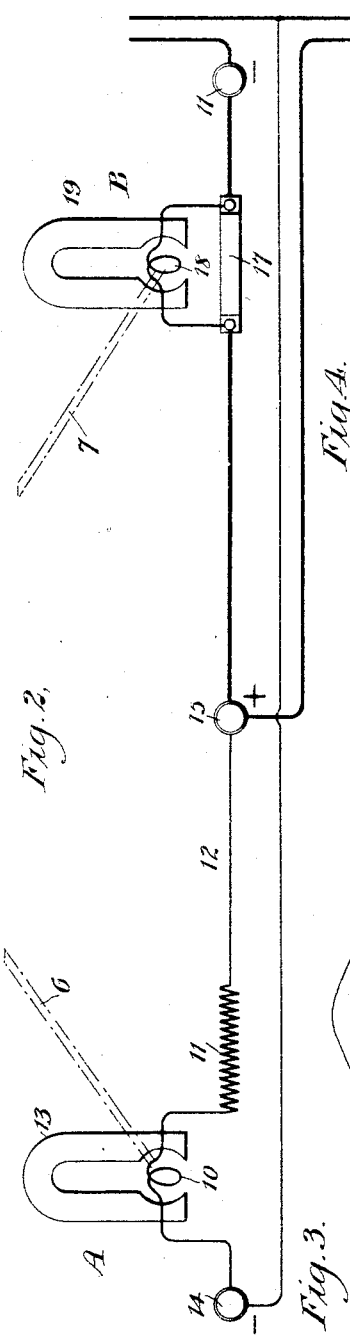
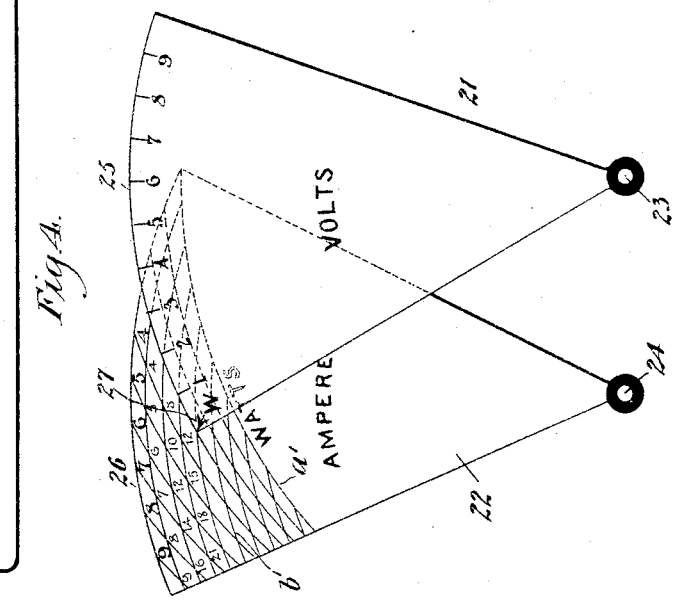
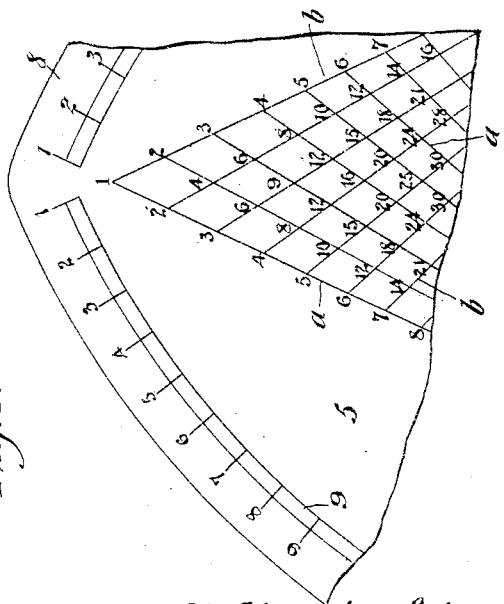
Witnesses
Edward Thorpe.
V. E. Nichols.
H. Hertzberg
W. P. Snyder
Inventors.
By their Attorneys
Griffin Bernhard & Cavanagh No. 791,785. Patented June 6, 1905.

UNITED STATES PATENT OFFICE.

HARRY HERTZBERG AND WILLIAM P. SNYDER, OF NEW YORK, N. Y.

DIRECT-READING HORSE-POWER AND WATT METER.

SPECIFICATION forming part of Letters Patent No. 791,785, dated June 6, 1905.

Application filed February 2, 1904. Serial No. 191,706.

*To all whom it may concern:*

Be it known that we, HARRY HERTZBERG and WILLIAM P. SNYDER, citizens of the United States, and residents of the city of New York, borough of Brooklyn, in the county of Kings and State of New York, have invented certain new and useful Improvements in Direct-Reading Horse-Power and Watt Meters, of which the following is a specification.

Our invention relates to improvements in electrical measuring instruments designed to indicate the wattage and the horse-power of electrical currents either alternating or direct, as well as to indicate separately the voltage and amperage of the current by the same instrument. In this art it is common to employ distinct voltmeters and ammeters in the measurement of electrical currents, each instrument including an indicating device which is commonly in the form of a pointer adapted to traverse a scale. It is also old to house the meters for the voltage and the amperage within a common casing; but in such instances there is a separate indication for each meter.

The use of separate meters is open to the serious objection in that time and labor are required to calculate the wattage and the horse-power of the current, and in some fields of service, as in electrically-driven motor-vehicles, this is particularly disadvantageous when the instrument is used by unskilled persons.

According to our invention we overcome the objections inherent to the use of such separate meters by the provision of a novel measuring instrument which includes a chart calibrated to indicate the wattage of the current, said instrument also including two movable members, which are controlled by devices that are influenced by fluctuations in the current indicative of variations in the volts and amperes of the current, said movable members having such relation to the inscribed faces of the chart as to secure direct reading of the watts and the horse-power, together with separate readings of the volts and the amperes, thus saving the time and labor of calculating the watts and the horse-power, which calculations are necessary when using ordinary instruments.

In the simplest embodiment of our invention the chart is inscribed with a plurality of intersecting lines arranged to be traversed by separate pointers, which move in crossing or intersecting paths and are actuated by separate devices that are controllable by the current, said chart being inscribed at the intersections of the lines with numbers representative of the watts.

Further objects and advantages of the invention will appear in the course of the subjoined description, and the actual scope of the invention will be defined by the annexed claims.

Reference is to be had to the accompanying drawings, forming a part of this specification, in which similar characters of reference are used to indicate like parts in all the figures.

Figure 1 is a plan view of the chart and the pointers employed in one embodiment of our direct-reading horse-power and watt meter. Fig. 2 is a diagrammatic view of the circuit. Fig. 3 is a plan view of a part of another form of the wattage-chart, and Fig. 4 is a plan view of another embodiment of the chart and the movable members of the meter.

In the construction shown by Figs. 1 and 2 the numeral 5 is used to designate the body of the chart, which may be made of any suitable material, and 6 7 indicate the pointers, which are arranged to traverse the graduations of the scales 8 9, the latter indicating the volts and the amperes, respectively, together with fractions thereof, in the usual manner.

An essential feature of the invention consists in the provision of the calibrations on the chart to indicate the watts and, if desired, the horse-power of the current, either direct or alternating. The chart is provided with two series or groups of lines $a\ b$, all of the lines $a$ radiating from the center or axis of movement of the pointer 6, while the other series of lines, $b$, radiate from the axis of movement of the pointer 7. The two sets or groups of lines are inclined reversely, and they cross or intersect, as shown by Figs. 1 and 3, each line of each group crossing all the lines of the other group. At the intersection of the lines of the two groups are numbers indicative of the watts, which are the product of the volts and the amperes, and this calibration of the chart is traversed by the pointers 6 7, that are actuated by devices A B, controllable by the current, to indicate separately the volts and the amperes on the scales 8 9.

The numbers indicating the watts increase in value progressively from the bottom number "1" toward the sides and the upper part of the chart; but although the highest number of watts indicated by the chart as shown by Fig. 1 is "2,250" it will be understood that the principle of the invention is susceptible of extension indefinitely.

To indicate the horse-power, the chart has cross-lines $c$ $c$ and the scales $c'$ $c'$, said cross-lines intersecting with the groups of reversely-curved lines at certain predetermined points. These cross-lines are preferably in contrasting colors to the lines $a$ $b$, and they are shown as reading up to three-horse power, while the scales also show the horse-power and the fractions thereof; but it should be understood that the horse-power indication may be extended indefinitely.

The pointers 6 7 swing in arcuate paths from the centers $6^a$ $7^a$, so as to traverse the calibrations of the chart, and these pointers lie in different planes in order that they may cross one another, thus allowing the watt-numbers directly opposite the intersection of the two pointers to be read directly from the chart. The voltmeter-pointer 6 is controllable by an ordinary form of actuating device A, herein shown as including a coil 10 in series with a resistance 11, placed in the circuit 12. This coil is within a permanent magnet 13, and it influences a movable member (not shown) that controls the voltmeter-pointer 6 in a well-known way, said pointer being held normally in a predetermined position at zero on the scale 8 by any well-known form of retractor, usually a spring. The conductor 12 of the circuit leads to a plurality of binding-posts 14 15 16, of which the post 15 is a positive post common to the actuating devices of the voltmeter and the ammeter.

With the pointer of the ammeter is associated the actuating device B, having a shunt in series with the circuit. The coil 18 of the ammeter device B is located within a magnet 19, and connects to both ends of the shunt, as shown by Fig. 2, and is common to all ammeters, said coil controlling the ammeter-pointer 7, which pointer is held normally at zero on the ammeter-scale by a suitable retractor. (Not shown.) As a matter of fact the voltmeter and the ammeter proper operate similarly to devices well known in the art, and our improvements reside in the novel organization of the two pointers and to the employment of a watt-chart or a horse-power chart or to a combined watt and horse-power chart, as delineated by the drawings.

The voltmeter may be used separately from the ammeter by disconnecting the conductor from the post 16, and in like manner the ammeter may be used separately from the voltmeter by disconnecting the conductor from the post 14.

In the normal position of the parts, with no current passing through the circuit, the retractors associated with the two actuating devices A B hold the pointers 6 7 at the unnumbered base-lines of the watt-chart and at zero on the scales 8 9 and $c'$ $c'$. The flow of current through the circuit and through the coils of the two meters actuates in the usual way to move the pointers across the watt-chart and the separate scales 8 9 $c'$ $c'$, according to the voltage and amperage of the current, whereby the watts may be read from the chart-numbers at the points of intersection of the pointers, according to the fluctuations of the current.

By reference to Fig. 1 of the drawings, it will be noted that the pointers 6 7 are each insulated electrically as near as possible to its center of oscillation. This overcomes the possibility of the current leaking across the movable pointers should they come in contact with each other while they are traversing the chart.

In the chart shown by Fig. 1 the numbers on the watt-scale and the scales 8 9 increase from the bottom toward the top of the chart; but this order of numbering may be reversed, as shown by Fig. 3.

It will be understood that the instrument of our invention includes a plurality of measuring instruments for indicating different electrical units and means, such as a chart, for indicating the resultant measurement of said instruments in units differing from those of the individual instruments. Our invention may also be embodied in the form of construction shown by Fig. 4, wherein the meter is shown as consisting of two movable members 21 22, swinging from the centers 23 24 and controllable by actuating devices similar to those indicated at A B in Fig. 2. The member 21 has along its arcuate edge a voltmeter-scale 25, while the other member 22 has an ammeter-scale 26 along its curved edge. The two members lie in different planes, so as to move in arcuate intersecting paths from the centers 23 24, and the underlapping member 22 is shown as having a watt-chart formed by groups of intersecting lines $a'$ $b'$, which are concentric with the axes 23 24. These groups of lines have watt indications at their intersections, and the member 21 has a pointer 27 adapted to indicate the watts by pointing to the numbers on the member 22;

according to variations in the positions of one or both of the movable members.

Changes in the form, size, proportion, and minor details of construction may be made without departing from the principle or sacrificing the advantages of our invention.

Having thus described the invention, what we claim as new, and desire to secure by Letters Patent, is—

1. An electrical measuring instrument having members swinging on parallel centers and in crossing paths, and a chart calibrated with horse-power indications and traversed by said members.

2. An electrical measuring instrument having members swinging on parallel centers and in crossing paths, and a chart calibrated with watt indications which are readable directly therefrom at the points of intersection of said members.

3. A direct-reading electrical measuring instrument including a wattage-chart and movable members swinging on parallel centers and influenced by fluctuations in the voltage and amperage of a current and so related to the wattage-chart as to afford a direct watt-reading thereon.

4. An electrical measuring instrument including movable members swinging on parallel centers and influenced by fluctuations in the voltage and the amperage of a current, and a watt-chart common to the movable members and affording a direct watt-reading in either of a number of positions adapted to be assumed by said members.

5. An electrical measuring instrument having a wattage-chart including groups of intersecting lines and watt designations at the intersections of the lines of said groups.

6. A direct-reading watt-meter having a chart provided with wattage indications, and pointers swinging on parallel centers and in intersecting paths across the chart and influenced by fluctuations in the voltage and amperage of a current.

7. A direct-reading electrical measuring instrument having a horse-power and wattage-chart formed by groups of intersecting lines and by cross-lines, said chart being also provided with numbers indicative of the watts and the horse-power, and pointers swinging on parallel centers and in intersecting paths across the chart.

8. A direct-reading electrical measuring instrument having a watt-chart, and separately-controlled pointers movable in arcuate paths and on parallel centers across the chart and adapted to indicate the wattage at the point of intersection thereof.

9. A direct-reading electrical measuring instrument comprising a chart having watt and horse-power indications, separate voltage and amperage scales, and separately-controlled pointers movable individually and on parallel centers across the scales and arranged to move in intersecting paths across said chart.

10. A direct-reading electrical measuring instrument having a chart, and insulated pointers traversing said chart in intersecting paths, said pointers being controlled by devices which are adapted to be influenced by the voltage and amperage of an electric current.

11. A direct-reading electrical measuring instrument comprising two oscillatory members, and a chart common to both members and calibrated to furnish power indications, the axes of oscillation of said members being in the same plane.

12. A direct-reading electrical measuring instrument comprising a chart calibrated with power indications, and oscillatory members the axes of oscillation of which are substantially parallel one to the other.

13. An electrical measuring instrument comprising a voltmeter, an ammeter, said meters having means for separately indicating the quantities measured thereby and means for combining the indications of the two meters to produce a single direct-reading indication in watts and horse-power.

14. An electrical measuring instrument comprising a voltmeter, an ammeter, each of said meters including a pointer, and means for combining the indications of the two meters to secure a single direct-reading power indication.

15. An electrical measuring instrument having two independent meters and means for combining the indications thereof to show the joint readings in horse-power.

16. An electrical measuring instrument comprising a voltmeter, an ammeter, a common positive connection and two negative connections for said meters, and means for combining the indications of the independent meters to produce a single resulting indication.

17. An electrical measuring instrument having independent oscillating members and a common chart for combining the indications of the members, the pivots of the members being electrically insulated and located in the same plane.

18. In an electrical indicating instrument, a plurality of measuring instruments provided with means for indicating different electrical units and means for measuring the resultant of said indications in units differing from those of the individual instruments.

19. In an electrical measuring instrument, a plurality of measuring instruments, in combination with a chart adapted to indicate a resultant unitary measurement in terms differing from those indicated directly by said instruments.

20. In an electrical indicating-instrument, a plurality of indicating instruments, in combination with means adapted to indicate a resultant unitary measurement in terms differing from those indicated directly by said instruments.

In testimony that we claim the foregoing as of our invention we have hereunto signed our names in the presence of two subscribing witnesses.

HARRY HERTZBERG.
WILLIAM P. SNYDER.

Witnesses:
H. I. BERNHARD,
R. B. CAVANAGH.